United States Patent [19]

Paulus et al.

[11] Patent Number: 4,743,889
[45] Date of Patent: May 10, 1988

[54] APPARATUS FOR MONITORING THE STATUS OR CONDITION OF SLIDING OR GLIDING COMPONENTS

[75] Inventors: Helmut Paulus, Herzogenrath; Karl-Heinz Paar, Aachen, both of Fed. Rep. of Germany

[73] Assignee: H. Krantz GmbH & Co., Aachen, Fed. Rep. of Germany

[21] Appl. No.: 939,705

[22] Filed: Dec. 9, 1986

[30] Foreign Application Priority Data

Dec. 14, 1985 [DE] Fed. Rep. of Germany ....... 3544246

[51] Int. Cl.⁴ .............................................. G08B 21/00
[52] U.S. Cl. .................................. 340/540; 340/665; 340/679
[58] Field of Search ............. 340/540, 679, 665, 52 A

[56]     References Cited
U.S. PATENT DOCUMENTS
4,204,190  5/1980  Wiley et al. ...................... 340/52 A Primary Examiner—Glen R. Swann, III
Attorney, Agent, or Firm—W. G. Fasse; D. H. Kane, Jr.

[57]     ABSTRACT

The operating condition of sliding components inserted between a slide or sprocket chain and a guide system for such chain is continuously monitored by an electrical loop conductor which passes through a plurality of sliding components. The electrical conductor is provided with an electrically insulating jacket which is preferably also heat resistant. The loop conductor is inserted into a monitoring circuit including a relay for activating an alarm when the loop conductor is either interrupted or when its insulation is damaged. This happens when any one of the sliding components through which the loop conductor passes, are sufficiently damaged. The alarm signal may also be used to stop the further drive of the sprocket chain.

9 Claims, 3 Drawing Sheets

APPARATUS FOR MONITORING THE STATUS OR CONDITION OF SLIDING OR GLIDING COMPONENTS

FIELD OF THE INVENTION

The invention relates to an apparatus for monitoring the status or condition of sliding or gliding components. These gliding components are, for example, attached to an endless sprocket chain and to a guide rail system for guiding the endless sprocket chain, for example, of a tentering frame. The gliding components slide along each other as the chain travels along the guide rail system.

DESCRIPTION OF THE PRIOR ART

In the present context these endless sprocket chains are also referred to as sliding chains because the chains slide along the guide rails of the guide rail system. For this purpose the sliding chains carry sliding components or elements which move along with the chain while the guide rails, or at least certain guide rails, carry sliding components or members which are stationary and cooperate with the moving sliding elements in supporting the sliding chains. The moving sliding elements of the chains and the stationary sliding members of the guide rails are made of materials which provide a suitable friction reducing sliding surface contact between the moving sliding elements and the stationary sliding members. Materials for this purpose are well known and they are selected for minimizing the quantity of needed lubricant. A suitable well known material is a combination of graphite, epoxy resin, and a binder material. The materials are conventionally selected to have a high wear and tear resistance and to make sure that even if the lubricant supply is temporarily interrupted, the sliding components, the chains, and the guide rails are not damaged or at least not seriously damaged.

In spite of the good sliding characteristics of the sliding components, even where there is a lack of lubrication in an emergency, there is the constant danger that individual sliding components may be substantially damaged or even completely destroyed. Such a situation causes the chain or portions of the chain to ride directly on the guide rail or portions thereof, whereby, for example, any remaining metallic securing means of the damaged or destroyed sliding elements or members cause an even increased wear and tear on the chain and on the guide rail.

OBJECTS OF THE INVENTION

In view of the foregoing it is the aim of the invention to achieve the following objects singly or in combination:

to provide a monitoring device which is capable to recognize the above described dangerous situation in the operation, for example, of tenter frame chains, and to provide a warning signal or a signal for stopping the chain advance;

to arrange the monitoring device in such a manner that, for example, all the stationary sliding members are continuously and simultaneously monitored for providing a warning signal if any one of the monitored sliding members should fail; and to make sure that normal wear and tear does not result in a warning signal.

SUMMARY OF THE INVENTION

The monitoring device according to the invention is characterized by an electrical conductor provided with an electrical insulation and inserted into the sliding elements and/or sliding members to form a continuous, normally uninterrupted loop for supplying an electrical voltage to a switch, such as a relay, for operating a contact in a warning circuit to energize the warning circuit in response to an interruption of the loop to thereby provide a warning signal, for example, by a lamp in the warning circuit. In addition to, or instead of the warning lamp, the warning circuit may also include accoustical signal generating means as well as means for stopping the further drive of the tentering frame chains.

Thus, the invention makes sure that a substantial damage of any of the sliding members is recognized in time for avoiding substantial resulting damages to the guide rail system and/or the slide chains.

By placing the electrical loop conductor into a groove in the back of a stationary sliding member, preferably so that the groove is then covered by a component of the guide rail system, it is assured that a certain determined wear and tear may occur, prior to damaging the loop conductor sufficiently for the generation of a warning signal.

The invention also provides a warning signal even if the loop conductor is not completely interrupted, but its insulation has been worn through so that a grounding of the loop conductor along its length occurs. Thus, it is assured, that the sliding element and/or sliding members are replaced only when their worn state justifies the replacement.

By passing the loop conductor through grooves which are initially open until the sliding members are attached to a component of the rail system, the entire manufacturing costs are minimized, the mechanical strength of the individual sliding members is hardly reduced by the groove, and the installation is simplified which also facilitates the maintenance work.

By insulating the loop conductor with a heat resistant insulating material, such as glass fiber cloth, Teflon ®, or the like, it is assured that the warning signal will not be given under normal operating conditions, for example, when the tenter chains travel through a heat treatment chamber for the fabric or the like carried by the tentering frame of which the tenter chains are components. Further, the normally occurring temperatures due to the sliding movement between the sliding elements and the sliding members, will not cause an alarm signal where the insulation of the electrical loop conductor is sufficiently heat resistant.

By arranging the loop conductor so to speak in series for a plurality of sliding members, an effective, yet cost efficient system is provided for the indication of a fault. The locating of the faulty sliding member or element is then relatively easy and it is not necessary to provide each of the sliding members and/or elements with its own monitoring device. However, a monitoring system may also be provided for each sliding member and/or element individually, whereby the alarm signal indicates the particular sliding element or member that is defective.

In order to protect the loop conductor against damage between neighboring sliding members or elements, it is recommended that the loop conductor forms a bight between neighboring sliding elements or members, whereby the bight is directed away from the slide surfaces. Thus, unintended damage to the loop conductor and hence erroneous alarm signals are avoided.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 4:
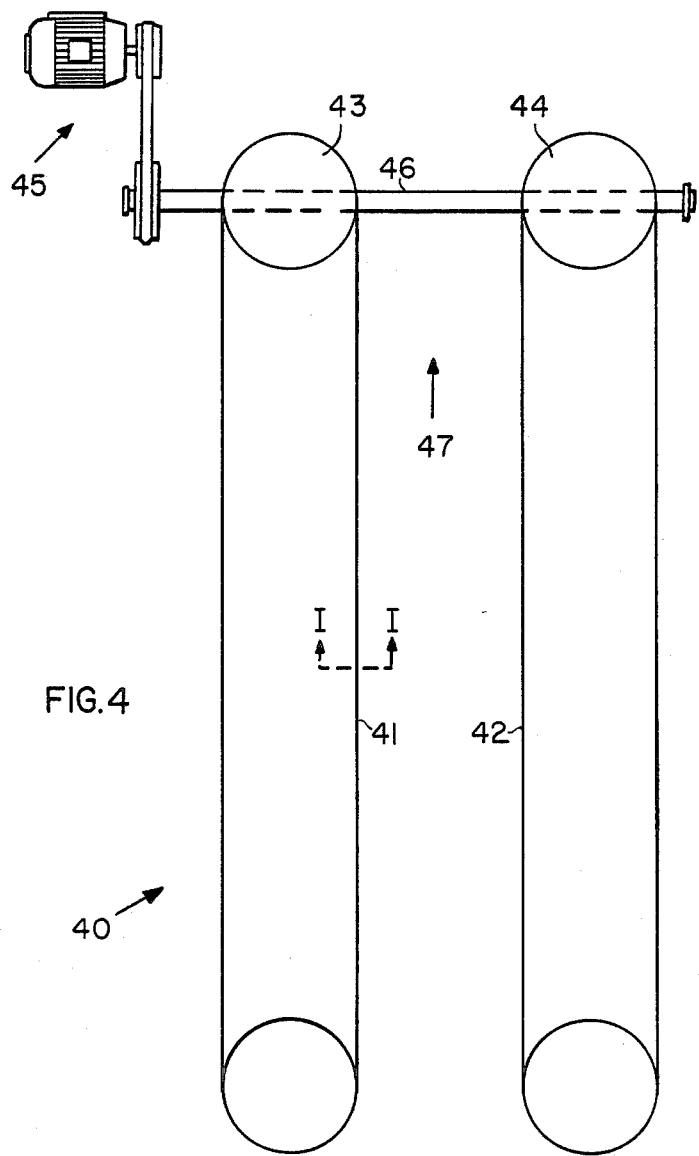
FIG. 4 is a schematic, simplified view of a tentering frame equipped with a monitoring system according to the invention.

FIG. 4 illustrates schematically one environment in which the invention may be advantageously used. FIG. 4 shows a tenter frame 40 comprising two sprocket or tentering chains 41 and 42 driven by sprocket wheels 43, 44, and drive means 45 including a drive shaft 46 operating bevel gears not shown, but of conventional construction for rotating the sprocket wheels 43, 44 in such directions that the chain runs facing each other move in the same direction, for example as indicated by the arrow 47, whereby the sprocket wheel 43 would rotate counterclockwise and the sprocket wheel 44 would rotate clockwise as viewed in FIG. 4. The structural details of such tentering frames are well known.

Figure 1:
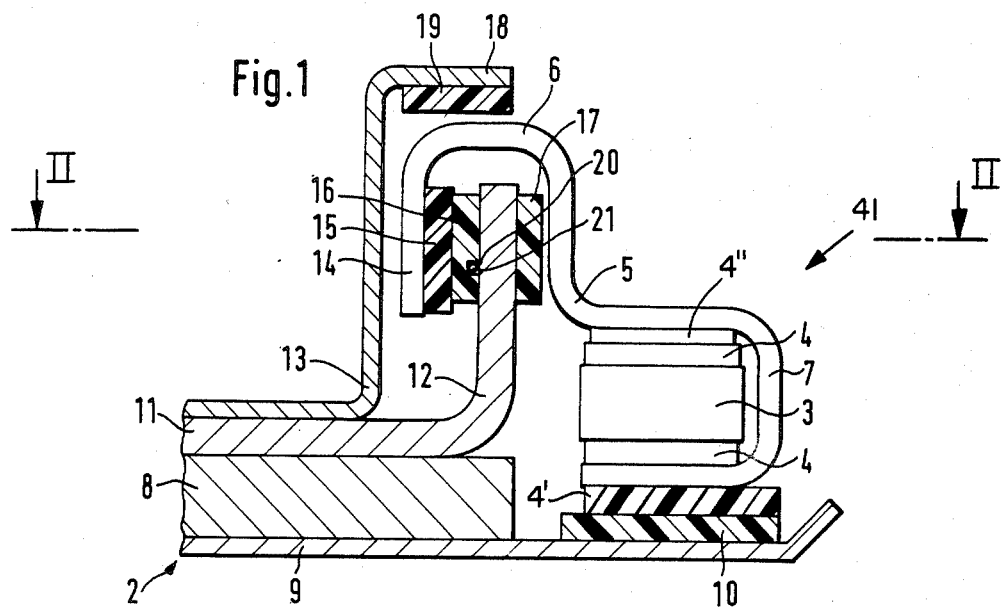
FIG. 1 is a view showing the guide rail system, the sliding elements, and the sliding members in section, while illustrating sliding or sprocket chain components in a side view, whereby the view direction is indicated by the arrows I—I in FIG. 4.

FIG. 1 shows a view of the inner run of the sprocket chain 41 in the running direction as indicated at I—I in FIG. 4. The sprocket chain 41 comprises conventional chain links 3 interconnected by so-called fishplates 4. The connecting bolts or rivets are not shown in FIG. 1 for simplicity's sake. Bails 5 are secured to the chain, for example, by the same connecting bolts which connect the fishplates 4 and the chain links 3. The chain links 3 are primarily rollers as is conventional in sprocket chains. A spacer plate 4" may be inserted between the lower bail section 7 which is secured to the sprocket chain and the respective fishplate 4. A slide element 4' of the type described above is secured to the lower leg of the lower bail section 7 for cooperation with a stationary slide member 10 secured to a support section 9 of the guide rail system 2. When the chain travels, the sliding element 4' is sliding along the sliding member 10.

The bail 5 also has an upper bail section 6 U-shaped as the lower bail section 7. The upper bail section 6 carries a further sliding element 15 attached to a downwardly reaching leg 14 of the upper bail section 6. Thus, the sliding elements 15 also travel along with the sprocket chain 41.

The rail system 2 comprises, in addition to the support 9, a main rail section 8 secured to the support 9 and a guide rail section 11 secured to the main rail section 8. The guide rail section 11 has an upwardly reaching leg 12 functioning as the guide rail for the sprocket chain 41. The upper end of the guide rail 12 carries two stationary sliding members 16 and 17. The sliding member 16 cooperates with the moving slide support element 15 of the chain. The slide support member 17 also cooperates with the chain and, if desired, the chain may be provided with a further sliding element facing the sliding member 17 between the bail 6 and leg 12.

The rail system 2 also comprises a further rail section 13 having an approximately Z-shaped cross-sectional configuration. The lower leg of the rail section 13 is secured to the guide rail section 11. The upper horizontally extending leg 18 of the rail section 13 carries a stationary sliding member 19 for cooperation with the upper bail section 6 of the sprocket chain 41 to thereby limit any upward excursion of the chain 41.

Figure 3:
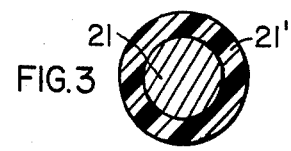
FIG. 3 is a sectional view through the loop conductor illustrating its heat insulating outer jacket.

According to the invention a loop conductor 21 having an electrically insulating, heat resistant jacket 21' as shown in FIG. 3, is inserted into a groove 20 of at least one of the stationary slide support members 10, 16, 17, 19. For simplicity's sake only one conductor is shown in FIG. 1 at 21. The groove 20 is so located that it will be closed when the respective slide support member, for example 16, is secured to the upper leg 12 of the guide rail 11, whereby the loop conductor is simultaneously securely held in place in the groove 20.

Figure 2:
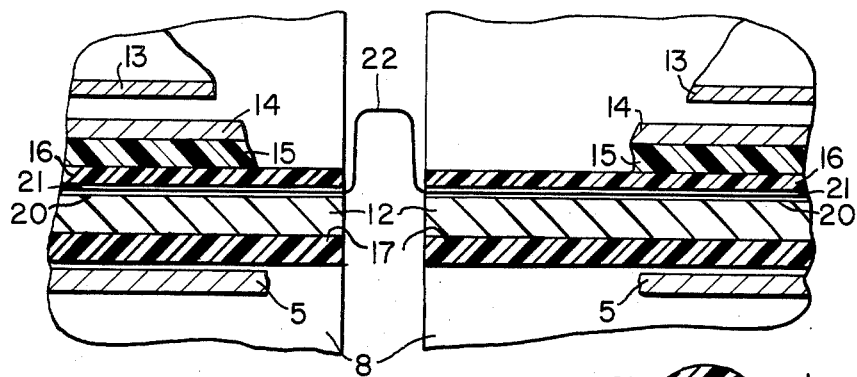
FIG. 2 is a sectional view along section line II—II in FIG. 1.

In FIG. 2 it is shown how the loop conductor 21 is formed into a bight 22 between adjacent bails 5. The bight 22 points away from the surfaces sliding along each other, thereby protecting the bight 22 and thus the loop conductor 21.

Figure 5:
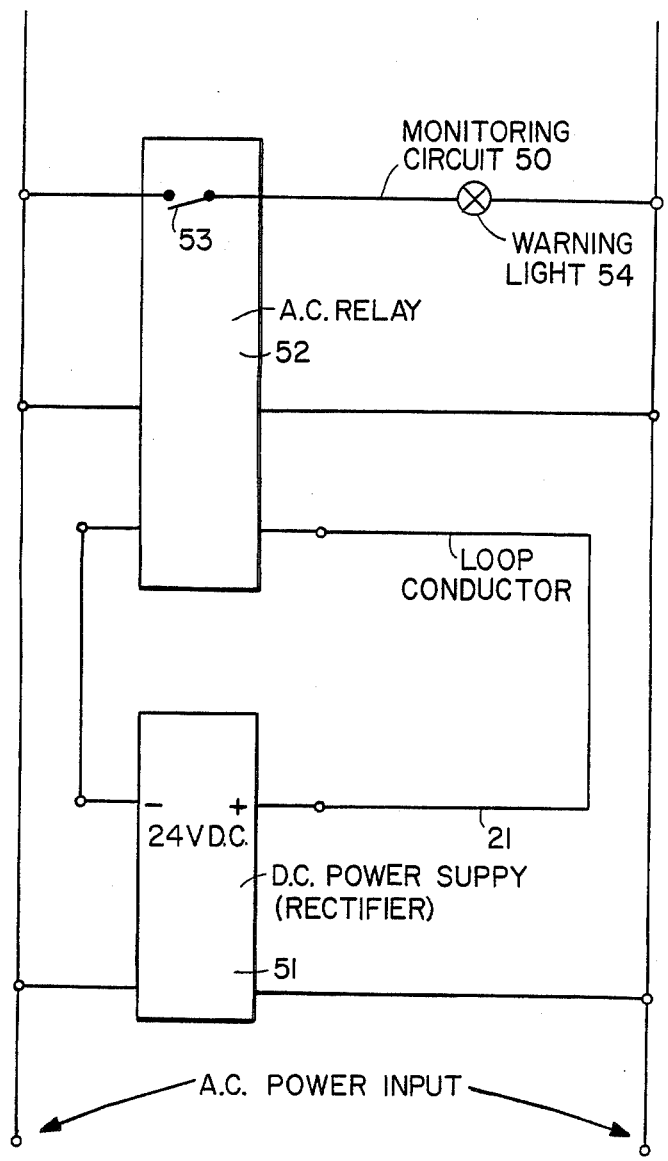
FIG. 5 shows a block circuit including a warning light according to the invention.

Referring to FIG. 5, the loop conductor 21 which passes preferably through all of the slide support members of a rail section of the guide rail system, forms a monitoring or loop conductor between a d.c. power supply or rectifier 51 and an a.c. relay 52 which is also connected to an a.c. power supply as shown. As long as the loop conductor 21 operates normally, the relay 52 keeps a contact 53 open. However, when the loop conductor 21 is interrupted or if it is grounded because its insulation 21' has been damaged, the relay 52 will close the contact 53, thereby energizing a monitoring circuit 50 to light up a warning light 54. The damage or interruption of the loop conductor 21 is always caused by a respective damage to any one of the stationary slide support members through which the conductor 21 forms a loop. Thus, the monitoring circuit will indicate that there is trouble anywhere along the respective sprocket chain. A further relay operated contact, not shown, may be used for stopping the respective chain drive.

Although the invention has been described with reference to specific example embodiments, it will be appreciated, that it is intended to cover all modifications and equivalents within the scope of the appended claims.

What we claim is :

1. An apparatus for monitoring the condition of sliding components, comprising first and second means for carrying said sliding components, said first and second means being movable relative to each other, electrical loop conductor means for said monitoring, electrical insulating means enclosing said loop conductor means for normally electrically insulating said loop conductor means from said first and second means, power supply means for providing electrical power, electrically operable switch means connected to said power supply means through said loop conductor means to form a closed circuit when said loop conductor means operates normally, warning circuit means including a warning signal device electrically connected to said switch means for providing a warning signal when said loop conductor means is not operating normally, and wherein said first means comprise a guide rail system, wherein said second means comprise an endless sprocket chain for travelling along said guide rail system, said sliding components comprising stationary slide support members secured to said guide rail system, and moving sliding elements secured to said endless sprocket chain, said loop conductor means being secured to said stationary slide support members in a serial manner so that the loop conductor means passes along a plurality of stationary slide support members one after the other, said switch means comprising means for energizing said warning signal device in said warning signal circuit means.

2. The apparatus of claim 1, wherein each of said stationary slide support members comprises a groove, said loop conductor means passing through said groove of each stationary slide support member having such a groove.

3. The apparatus of claim 2, wherein said groove has an open side toward a backside of the respective stationary slide support member.

4. The apparatus of claim 3, wherein said backside of said stationary slide support members is secured to said guide rail system so that said loop conductor means is held inside said stationary slide support members by said guide rail system.

5. The apparatus of claim 1, wherein said electrical insulating means of said loop conductor means are heat resistant insulating means, wherein said guide rail system comprises a plurality of rail sections at least some of which carry said stationary slide support members, and wherein said loop conductor means is connected to all stationary slide support members of at least one rail section.

6. The apparatus of claim 5, wherein said electric loop conductor means comprises bights between neighboring stationary slide support members, said bights being directed away from cooperating slide surfaces of said stationary slide support members and said sliding elements.

7. The apparatus of claim 1, wherein said electrically operable switch means respond to an interruption of said loop conductor means.

8. The apparatus of claim 1, wherein said electrically operable switch means respond to a grounding or partial grounding of said loop conductor means.

9. The apparatus of claim 1, wherein said electrically operable switch means comprise an alternating current operable relay switch also having a d.c. winding.

* * * * *